INVENTORS:
MAYNARD FORD and
CHARLES D. LEE, JR.

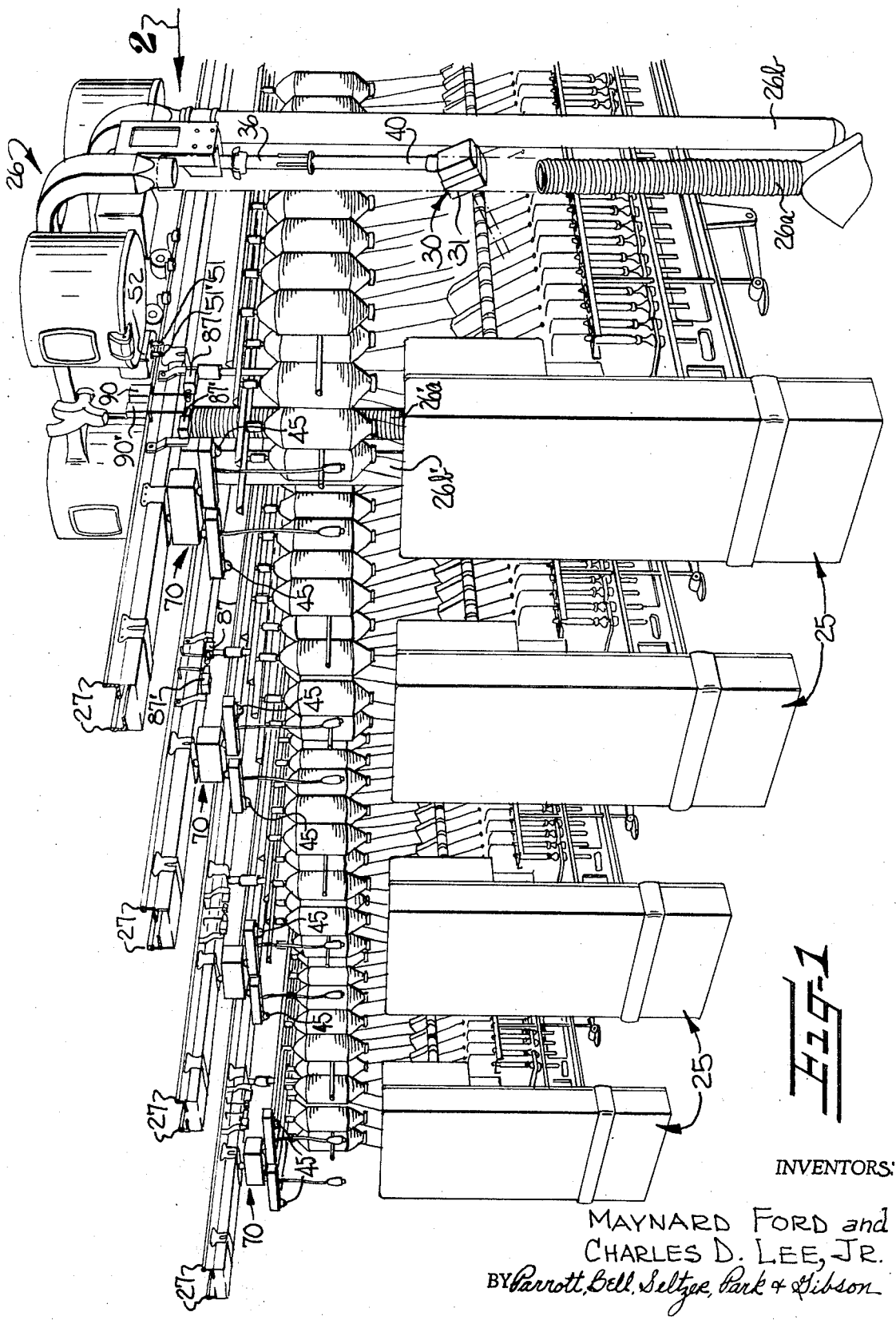

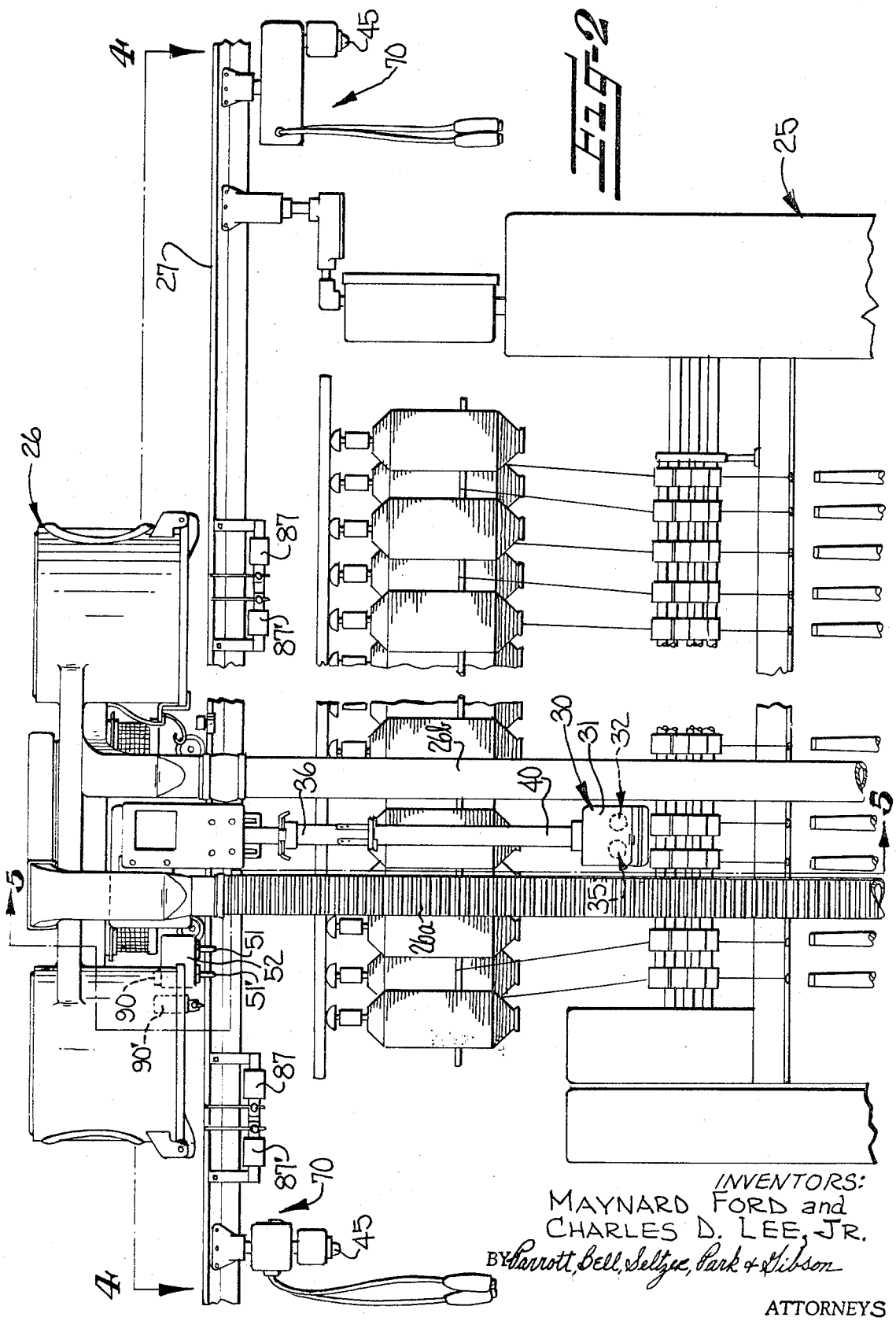

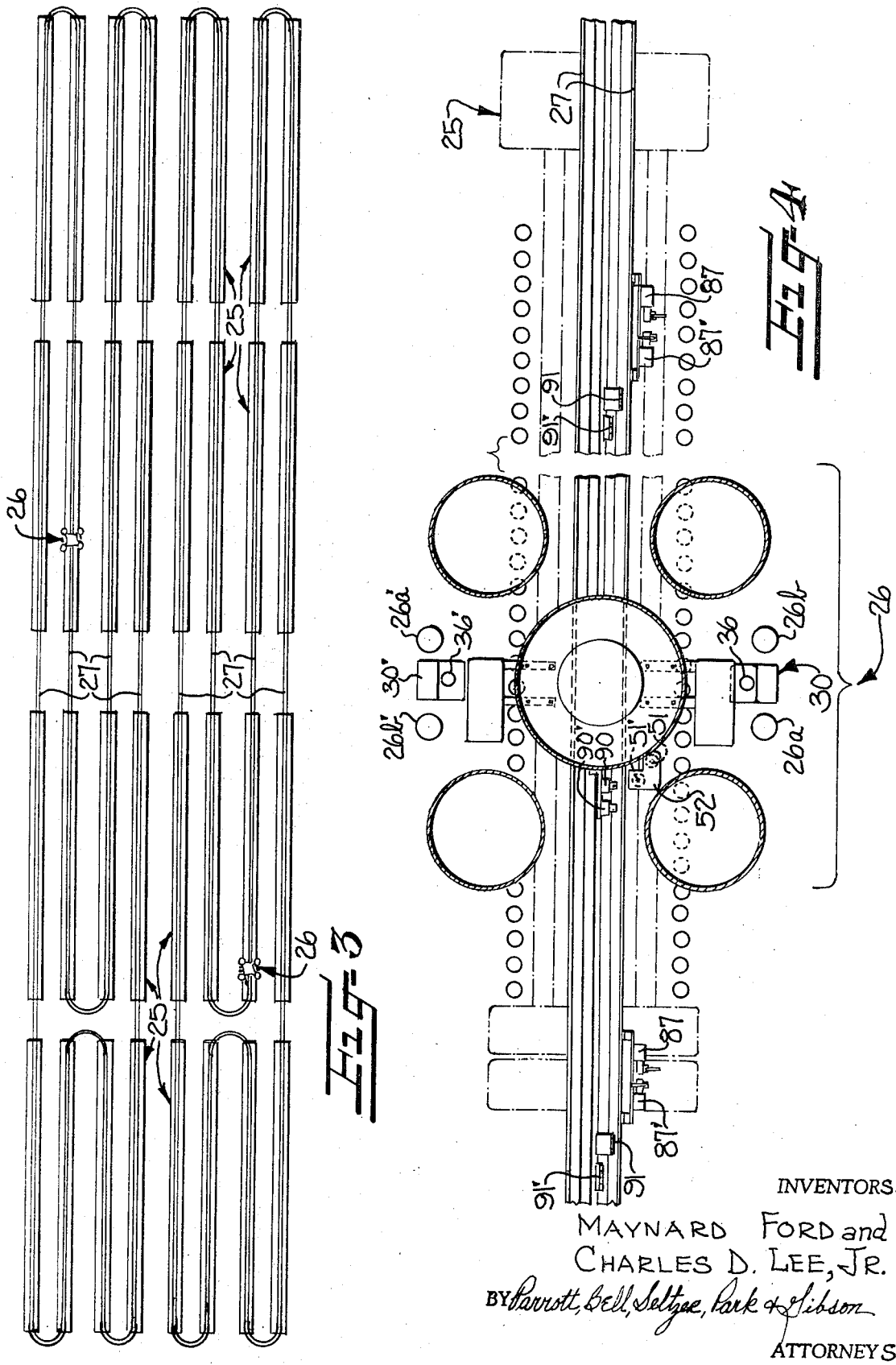

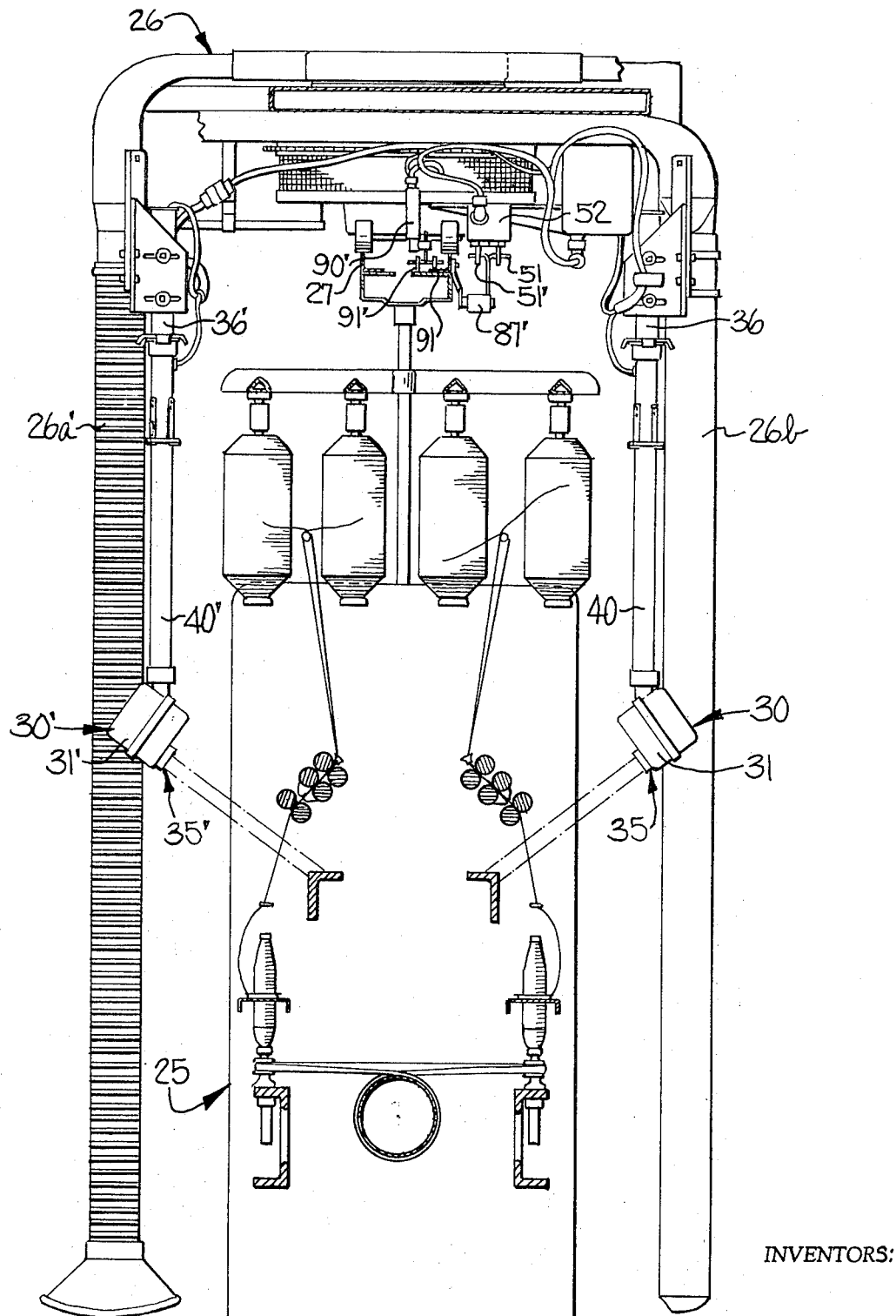

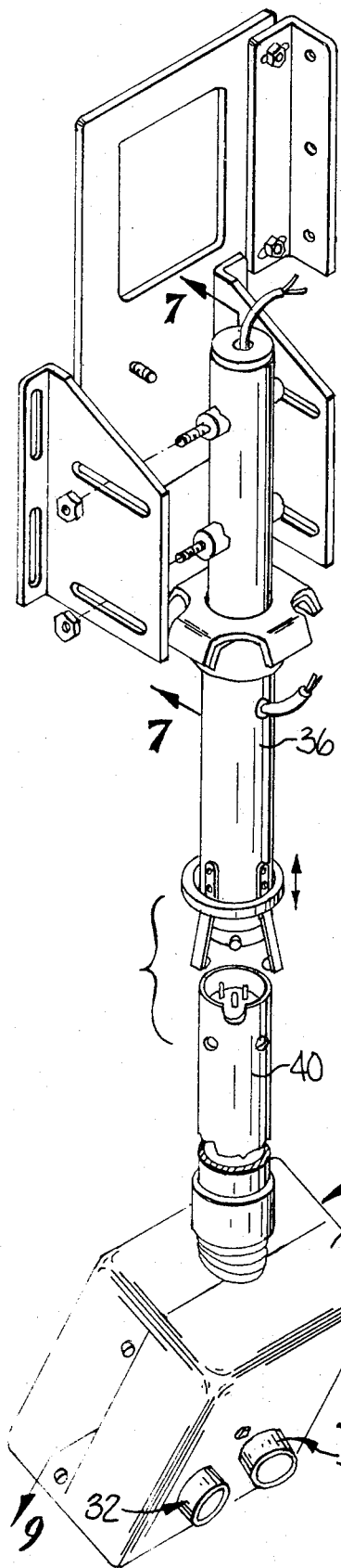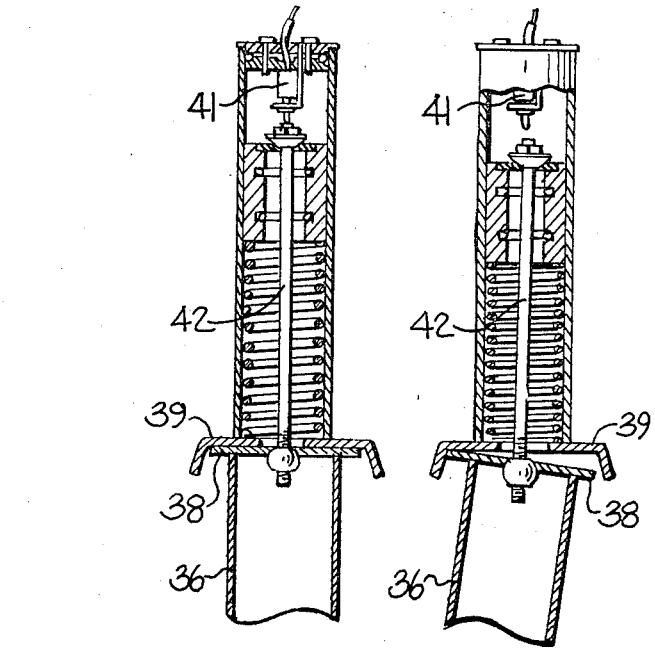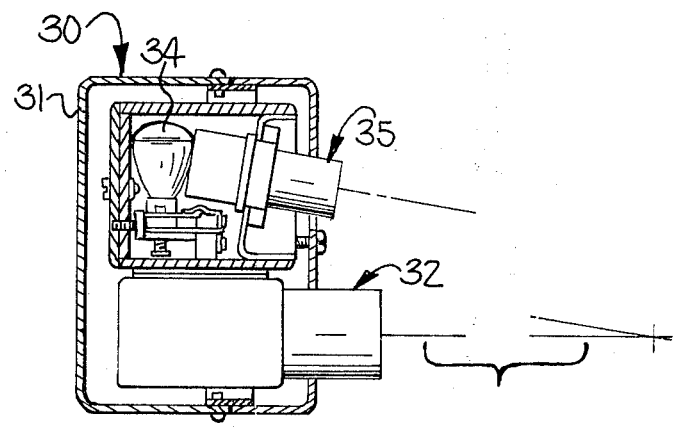

BY Parrott, Bell, Seltzer, Park & Gibson

ATTORNEYS

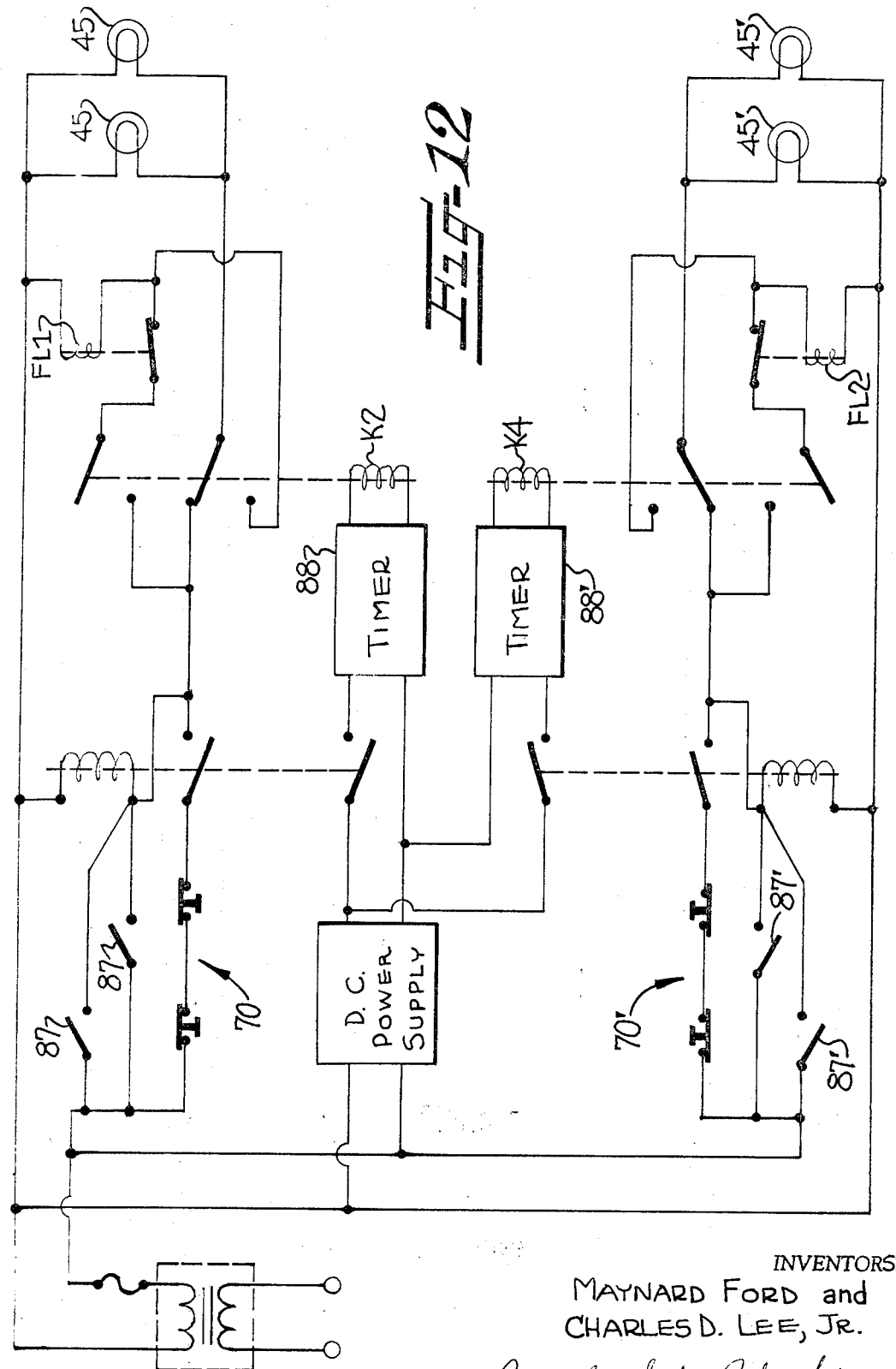

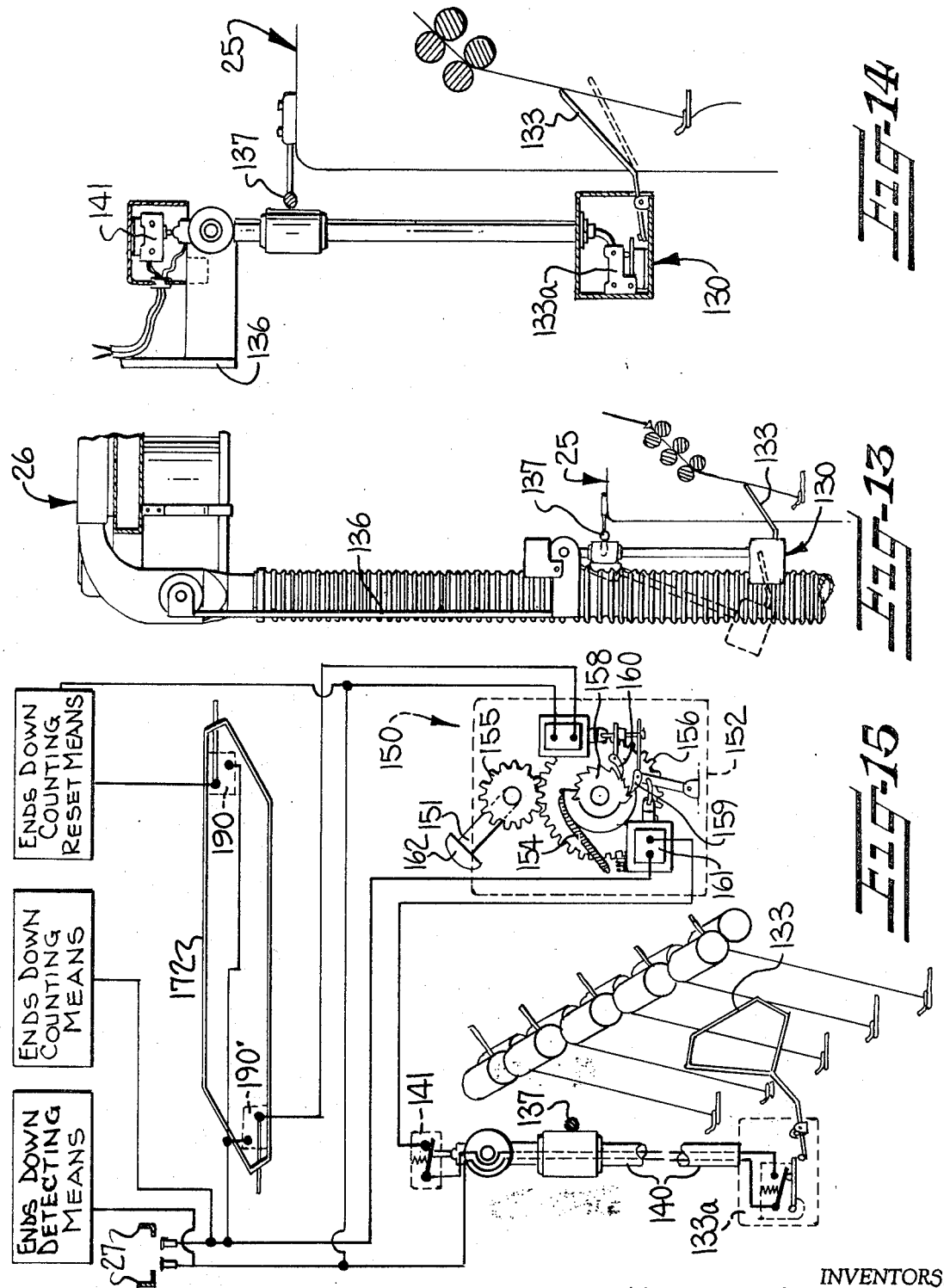

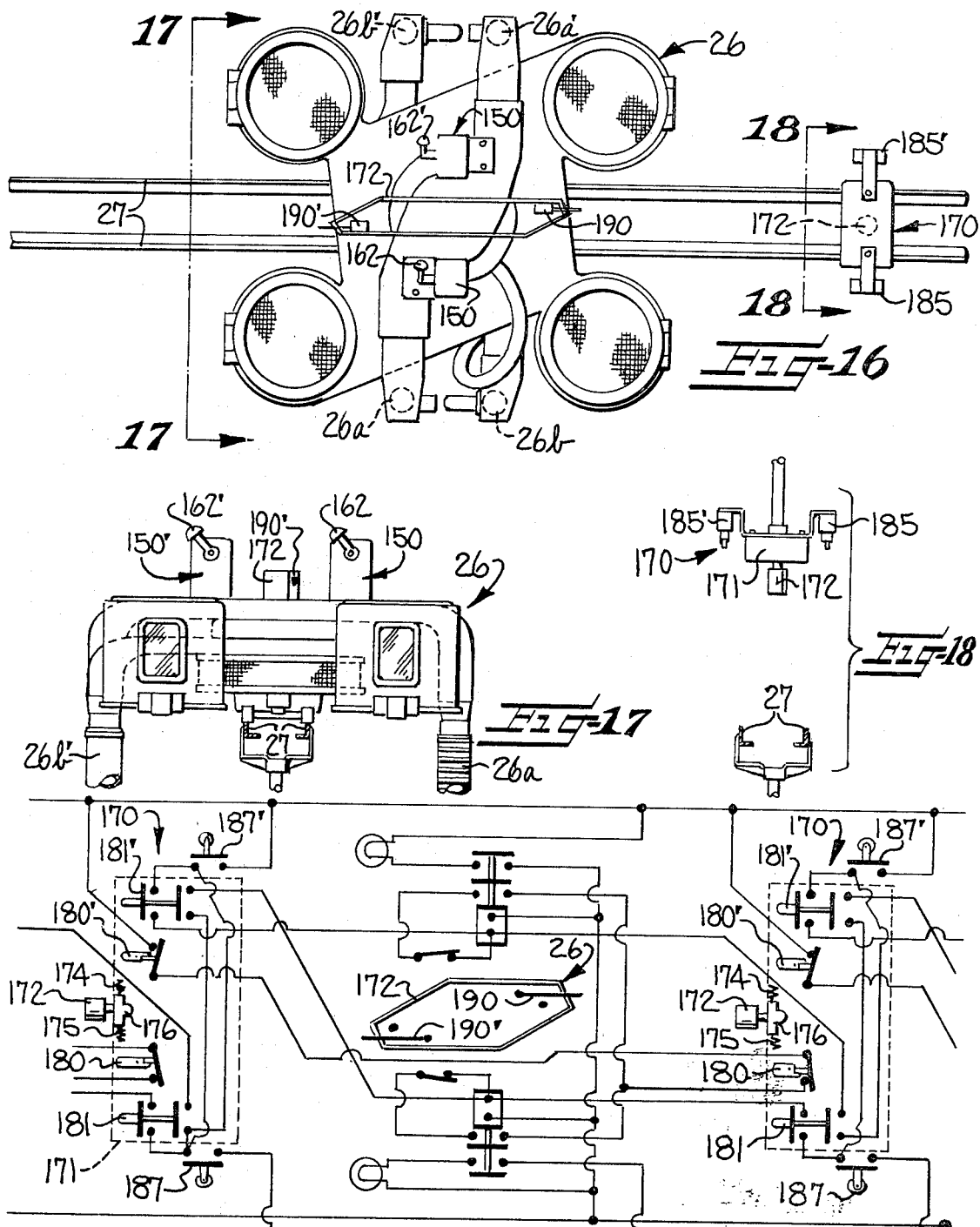

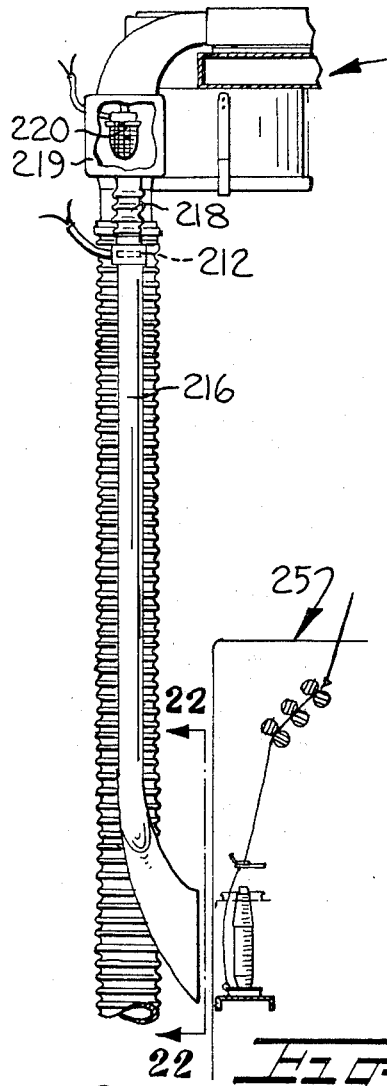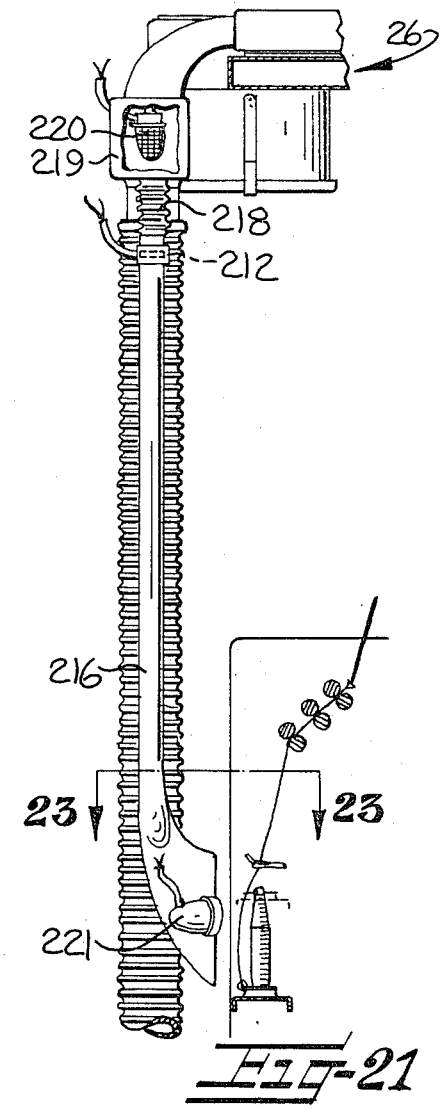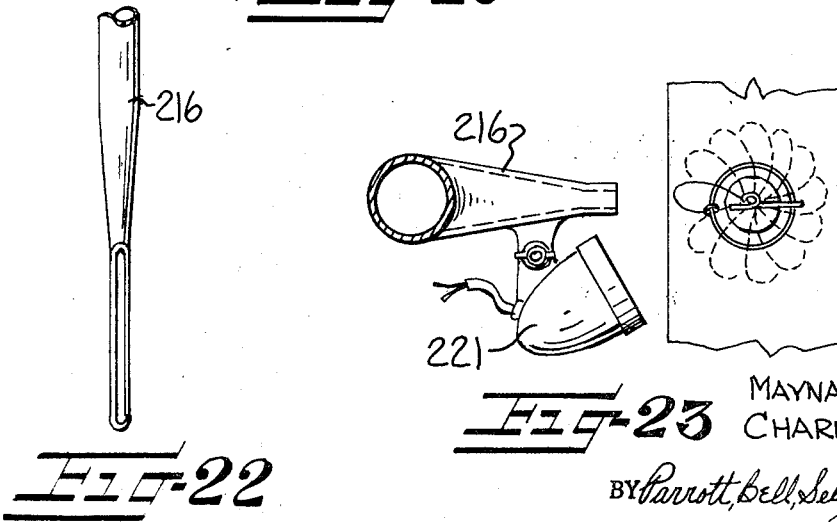
INVENTORS:
MAYNARD FORD and
CHARLES D. LEE, JR.
BY Parrott, Bell, Seltzer, Park & Gibson
ATTORNEYS 3,523,413
APPARATUS AND METHOD FOR DETECTING AND REPORTING ENDS DOWN ON TEXTILE MACHINES
Maynard Ford, Fitchburg, Mass., and Charles D. Lee, Jr., Charlotte, N.C., assignors to Parks-Cramer Company, Fitchburg, Mass., a corporation of Massachusetts
Continuation-in-part of application Ser. No. 706,287, Feb. 19, 1968. This application Jan. 29, 1969, Ser. No. 794,880
Int. Cl. D01h *13/26, 13/16, 13/32*
U.S. Cl. 57—34          53 Claims

ABSTRACT OF THE DISCLOSURE

Apparatus and method for detecting and reporting the ends down condition of textile yarn or thread forming machines such as spinning and twisting machines, wherein a detector mounted on and/or movable with a traveling unit such as a pneumatic cleaner monitors the yarns or threads being formed on the textile machine. Data as to the presence and absence of ends of yarn on a traversed machine is collected from the detector and transmitted from the traveling unit to a data collecting and display system for indicating an ends down condition of a traversed machine and for permitting a machine operator to selectively patrol the particular machine sides the operator is assigned to tend, in accordance with the indicated conditions of the machines and for the purposes of improving efficiency in the tending of the machines.

---

This application is a continuation-in-part of our co-pending application filed Feb. 19, 1968 under Ser. No. 706,287 and entitled Ends Down Detecting and Reporting Apparatus and Method and now abandoned.

Two examples of textile yarn or thread forming machines are the spinning frame and the twister frame. A spinning frame produces yarn from a roving or sliver of textile fiber material by drawing and twisting the material. A twister frame produces plied yarn or thread from yarn by twisting two or more yarns together. Other specific examples of this class of textile machine will be recognized by persons knowledgeable in the art of textile manufacturing. Any such machine usually processes a number of yarns or ends, packaging each end by winding the same about a spindle supported bobbin or otherwise suitably forming the yarn into a package.

In the operation of such machines, it is the responsibility of an operator to correct improper operating conditions of the machines in order to maintain efficiency of production. The most frequently occurring improper operating condition is the breakage of a yarn being formed, referred to as an end down. Upon detection of an end down by a spinning frame operator or spinner, the spinner pieces the yarn together in an operation known as putting up or piecing up an end.

Yarn or thread forming machines such as spinning frames are usually fairly narrow in width and relatively long. Typically, a plurality of spinning frames are arranged in a mill room with two or more spinning frames aligned end to end and extending longitudinally to form a row and a plurality of such rows arranged side by side to form transverse lines of machines. The aisles fomed between the rows are usually relatively narrow, just sufficient to provide access to the sides of the spinning frame by spinners and necessary machine tending equipment. Access to the operator's work aisles is from one or more cross alleys adjacent the ends of the spinning frames, extending transversely to or at the ends of the longitudinal rows, such as between the lines of machines or between a machine and an adjacent wall. Due to the length of yarn forming machines and the placement of such machines as described, it is impractical for a spinner to detect and correct ends down other than by walking up and down the longitudinal rows of machines.

Customarily, spinners patrol a plurality of sides of machines by walking an assigned predetermined path in the work aisles between the frames. The number of machine sides, or the total number of spindles, assigned to an individual spinner is usually based on the minutes the spinner will work during each hour of machine operation, the operation, the time required for the spinner to walk the length of a frame, the time required to put up a number of ends of yarn which are likely to be down on a machine side during each hour, and the time required for any other tasks assigned to the spinner. Such a job assignment results in a spinner spending a substantial portion of time walking along the length of the frames searching for ends down, much of which time otherwise could be spent more effectively in piecing up ends.

It is usual practice to provide, in conjunction with yarn or thread forming machines, traveling pneumatic cleaners for removing lint and the like from the textile machines and mill room by flowing currents of air. One or more of such traveling pneumatic cleaners are normally used for any given number of textile machines, each mounted for movement along a predetermined path to traverse one or more machines.

Since the traveling pneumatic cleaners are patrolling a predetermined route, it has been realized that such a traveling unit will enable a significant change in work assignment methods if used in accordance with the invention hereinafter described to patrol for and locate ends down on the spinning frames included in a traveling cleaner circuit. Accordingly, it is an important object of this invention to permit a textile machine operator to selectively patrol the textile machines the operator is assigned to tend, in response to indicated ends down conditions of the machines.

This object includes the provision of apparatus for and a method of obtaining an indication of the ends down condition of a number of textile yarn forming machines arranged in a textile mill in longitudinally extending rows with at least one cross alley for the purposes of facilitating more efficient tending of the machines by the combination with the machines of one or more traveling units each supported for travel along a respective predetermined path for traversing one or more of the machines, detector means mounted on each of the traveling units for monitoring ends of yarn normally being formed by a traversed machine, register means responsive to the detector means for determining the ends down condition of a traversed machine from the monitored ends, and data collecting and display means responsive to the register means for indicating the ends down condition of each of the machines upon the same being traversed by the traveling units. In realizing this object by permitting spinners to tend those frames which are in need of having ends put up, and generally by indicating a particular frame side where the number of ends down is excessive, it is contemplated that the division of an operator's time between walking and putting up ends may be markedly changed, thus substantially increasing the portion of the operator's time spent in piecing up ends, reducing fatigue and saving labor.

It is another important object of this invention to decrease the physical effect of walking required of an operator in tending a particular job assignment by permitting the operator to selectively patrol in accordance with this invention, thereby having significant psychological effects on employees by demonstrating the interest of mill ownership in providing sophisticated equipment to aid employees in better performing their assigned jobs.

In realizing these objects of the present invention, detector means are provided on or arranged to move with one or more traveling units, preferably traveling pneumatic cleaners. Each of the traveling units is adapted to travel along a predetermined path traversing one or more of a predetermined number of machines arranged in a textile mill, without interuption due to the ends down condition of a traversed machine but with the detector means being operable in response to ends down on the machine. A data system is provided which is responsive to operation of the detector means on the traveling units and which indicates the ends down conditions of the machines so that a spinner is permitted to devote more time to the putting up of ends, and a reduction in the total operator hours required to tend a predetermined number of machines is facilitated. The data system thus provided may also be utilized to report the ends down condition of the textile machines to one or more locations where machine and personnel efficiency is to be monitored.

It is recognized that detecting ends down is generally not sufficient, because a textile machine side in certain instances may be run with a small number of ends down, such as three to six ends, before the operating condition of the machine becomes so inefficient and uneconomical as to need the attention of a spinner to piece up the ends. Therefore, it is an object of this invention to give to the mill supervisory personnel the prerogative of predetermining what number of ends down is excessive and to include, in a total data system, register means capable of distinguishing as excessive the number of ends detected to be down on a given frame side. By processing data in such a manner, the selective patrol system of the present invention may be accommodated to that particular mill.

It is further recognized that a machine which has an excessive number of ends down will compound the inefficiency of its condition if permitted to run in that condition for an extended period of time while other machines are tended. Accordingly, it is an object of this invention to warn an operator that the period of time that a machine has gone without needed attention has been excessive. By such a warning, both a machine operator and mill supervisory personnel are advised that a machine which has been determined to be in need of having ends put up has not been returned promptly to full service.

Yet another object of this invention is to provide a method facilitating reduction of the total operator hours required to tend a predetermined number of textile yarn forming machines, in accordance with which the machines are automatically traversed at predetemined intervals with at least one pneumatic traveling cleaner having a detector moving therewith, yarns being formed by the machine are monitored by the detector as the cleaner traverses the locations at which such yarns are normally present, the detector senses the presence and absence of the yarns, and the sensing is reported and indicated so that an operator of the textile machines may tend the machines in accordance with the indicated ends down conditions thereof.

It has been proposed that the working conditions in spinning mills be improved by the use of powered carts for transporting spinners about the mill room, some of which have ends down detector means for stopping the cart automatically at a machine location where an end is down. While those carts which only transport spinners are adequate for that specific purpose and those which have ends down detector means do supplement or replace the human eye in locating an end down, none of such proposals provide data to a spinner which will permit the spinner to selectively patrol those frames requiring attention. Moreover, such powered carts are not open to the possibilities of data collection and processing which flow from the appartaus and method of this invention.

Some of the objects of the invention having been stated, other objects will appear as the description proceeds when taken in connection with the accompanying drawings, in which—

FIG. 1 is perspective view of a textile mill room showing an installation of an apparatus in accordance with the present invention, as associated with a plurality of spinning frames;

FIG. 2 is a side elevation of a portion of the apparatus illustrated in FIG. 1, with a spinning fame being broken along its length in order to include both ends of the frame within the view of FIG. 2;

FIG. 3 is a plan view of a textile mill room similar to that from which FIGS. 1 and 2 are taken, showing the arrangement of a plurality of spinning frames therein;

FIG. 4 is a plan view, in partial section, through the apparatus shown in FIG. 2, taken generally along the line 4—4 in that figure;

FIG. 5 is an end elevation view, in partial section, through the apparatus of FIG. 2, taken generally along the line 5—5 in that figure;

FIG. 6 is an enlarged perspective view, in detail, of a portion of the apparatus of FIGS. 1, 2 and 5;

FIGS. 7 and 8 are elevation views, in section, through a portion of the structure shown in FIG. 6, taken generally along the line 7—7 in FIG. 6;

FIG. 9 is a plan view, in partial section, through a portion of the apparatus shown in FIG. 6, taken generally along the line 9—9 in FIG. 6;

FIG. 12 is a schematic diagram of other circuit functions incorporated in the apparatus of FIGS. 1, 2 and 5;

FIG. 13 is an end elevation view, in partial section showing a portion of a first modified form of the apparatus of FIGS. 1, 2 and 5;

FIG. 14 is an enlarged view similar to FIG. 13 and in patrial section, showing certain details of the first modified form of apparatus;

FIG. 15 is a view somewhat similar to FIG. 13, further including a schematic diagram of certain functions of the first modified form of apparatus in accordance with the present invention;

FIG. 16 is a plan view of the first modified form of apparatus in accordance with the present invention, incorporating features shown in FIGS. 13 through 15;

FIG. 17 is an end elevation view of a portion of the apparatus of FIG. 16, taken generally as indicated by the line 17—17 in FIG. 16;

FIG. 18 is a view somewhat similar to FIG. 17, taken as indicated by the line 18—18 in FIG. 16;

FIG. 19 is a schematic diagram of certain electric circuitry cooperating with the circuitry of FIG. 15;

FIG. 20 is a view similar to FIG. 13 of a second modified form of apparatus of the present invention;

FIG. 21 is an enlarged elevation view of a portion of the apparatus of FIG. 20, taken generally along the line 21—21 in FIG. 20;

FIG. 22 is a view similar to FIG. 20 of a third modified form of apparatus of the present invention; and FIG. 23 is an enlarged plan view, in partial section, of a portion of the detector means of FIG. 22 and of a spinning frame, taken generally along the line 23—23 in FIG. 22.

Figure 10:
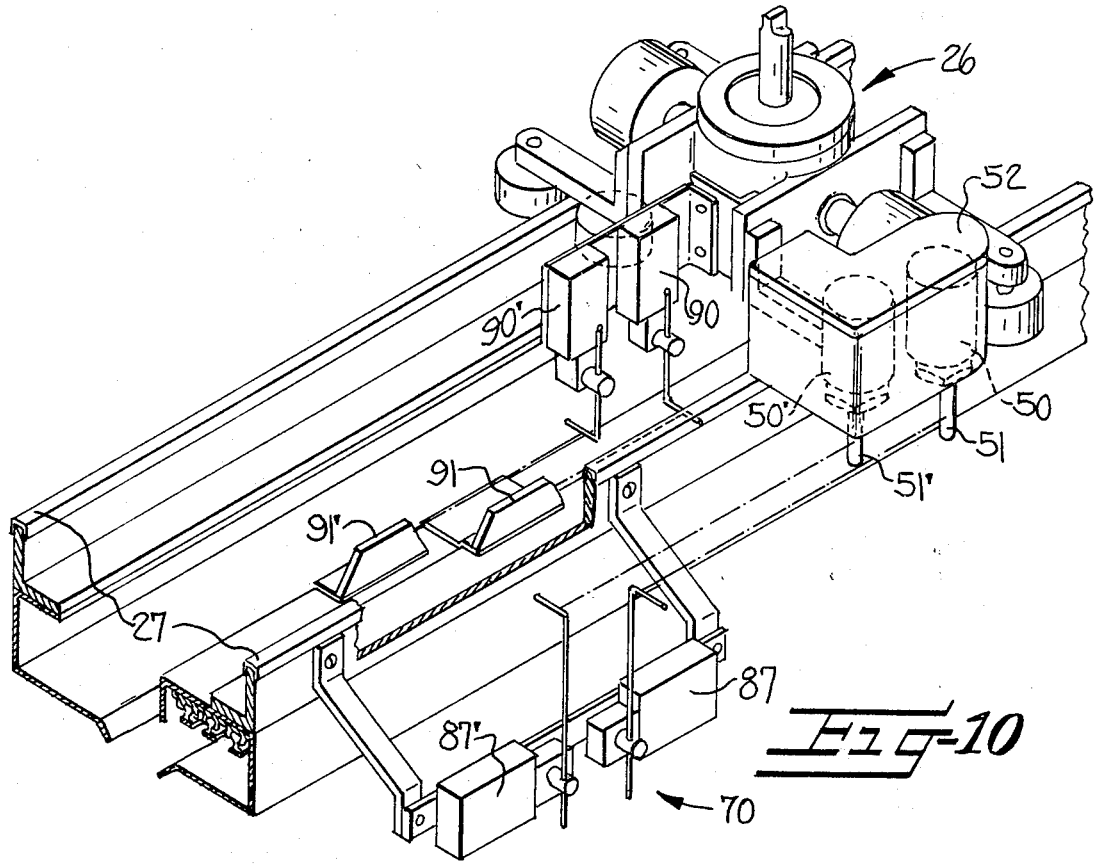
FIG. 10 is an enlarged perspective of certain portions of the apparatus of FIGS. 1, 2 and 5.

Referring now more particularly to the drawings, a preferred form of apparatus in accordance with the present invention is there disclosed (FIGS. 1–12) in operating relation to a number of textile yarn forming machines arranged in a plurality of rows in a textile mill. In the illustrated textile mill, a number of spinning frames 25 are arranged in rows of four in a spinning room, in a typical pattern (FIG. 3). One or more traveling units are supported for traversing the textile machines 25 along predetermined paths of travel. In the specific apparatus chosen for illustration in the drawings, the traveling units are traveling pneumatic cleaners 26 substantially identical to the fourth embodiment disclosed in U.S. Pat. No. 3,304,571, issued on Feb. 21, 1967 and owned in common with the present invention. As disclosed in that patent, each of the traveling cleaners 26 is supported for movement along a track 27 extending above the spinning frames 25, which track is shown to describe a closed pattern of so-called H-loop configuration. As further disclosed in that patent, each of the traveling cleaners 26 includes drive means for driving it in movement along a track so as to traverse the machines in its circuit automatically and at predetermined intervals. While such an arrangement is a conventional choice for a traveling pneumatic cleaner and a manner of supporting such a cleaner for traversing textile machines, it is to be understood that this choice has been made for purposes of illustration only. The present invention contemplates that the traveling unit of this invention or the manner in which the unit is supported and arranged for traversing a textile machine may be changed in varying ways, including limitation of the path of travel of a unit to traversal of a single machine only.

In order to monitor the condition of ends of yarn normally being formed at machine locations along a textil machine 25, during traversal thereof by a traveling unit to determine the ends down condition of the machine, the present invention provides detector means movable along the predetermined path established by the track 27. The detector means may comprise any suitable means for sensing the presence, absence, or both presence and absence of an end without interfering with the yarn forming apparatus and preferably is carried by a traveling cleaner 26 for movement therewith. As illustrated in the preferred form of apparatus, the detector means broadly includes a pair of sensor heads 30 and 30' positioned to pass adjacent portions of a spinning frame 25 wherein yarns being formed on each side thereof are exposed, and sensing means may be carried within the sensor heads for sensing the condition of the yarns as the traveling cleaner 26 traverses the frame. While it may be noted that the traveling cleaner has a pair of sensor heads thereon for scanning both sides of a spinning machine, the discussion herein is given largely with reference only to one of such heads. Like elements of the detector means which are duplicated are identified throughout this discussion by prime notation of like reference characters.

Preferably, the sensing means associated with the head 30 is an energy device, contemplated as being responsive to radiant energy variations characteristic of the presence of an end of yarn. More specifically, a photosensitive device such as an electron tube of the photomultiplier type or other electrical transducer is housed by a box 31 within a sensor head 30, in operative association with an arrangement of lenses generally indicated at 32. A suitable light source such as a lamp 34 is also mounted within the sensor head 30, to direct light energy through a lens arrangement generally indicated at 35 toward the ends of yarn in an area of the traversed frame 25 intermediate the drafting system and the spindle (FIGS. 9 and 5). By the inclusion in the optical arrangement of a pinhole or aperture, the field of view of the photosensitive device is limited, specular reflection from components of the spinning machine 25 to the photosensitive device is avoided, and the ends of yarn are viewed by the photosensitive device as highly illuminated against a dark or matte background. A resultant signal is passed to register means as described hereinafter to control the transmittal of data regarding the ends down condition of a frame traversed.

In the illustrated embodiment, the suspension structure provided for the sensor head includes an upper arm 36 secured to the suction and blowing ducts 26a, 26b, of the traveling cleaner 26 by means of mounting brackets (FIG. 6). The upper arm 36 includes a spring loaded joint (FIGS. 7 and 8) which permits the sensor head 30 to be pivotally displaced about axes determined by fulcrum points of engagement between opposing plates 38, 39, in order to insure proper positioning of the sensor heads with respect to the spinning frames 25 while accommodating the movement necessary to clear any obstructions which may be present in the aisles between the machines. To permit ready interchange of sensor heads, for purposes of simplifying field maintenance, the head 30 is mounted at the lower extremity of a lower arm 40 for detachable connection with the upper arm 36. The sensor heads are positioned between the flexible suction ducts and blowing sleeves of the cleaner 26 in order to both present a compact arrangement of the detector means with the traveling cleaner 26 and to shield the sensor heads 30 and 30' and suspension arrangements therefor from unnecessary and undesirable impact with obstacles in the mill room aisles and alleys.

In order to insure that a signal from the photosensitive device truly reflects the condition of a monitored yarn rather than merely the displacement of the sensor head 30 on engagement with an aisle obstruction, this invention further provides an override switch 41 in the suspension arrangement for the sensor head 30, mounted within the upper arm 36 adjacent the spring loaded joint. By means of a tie rod 42, the override switch 41 is operated in response to the angular displacement of the lower arm 40 and sensor head 30 (shown by comparison of FIGS. 7 and 8). As the head is swung out of alignment with the desired position, the tie rod 42 is retracted from the override switch 41 and causes interruption of normal circuit operation until such time as the sensor head 30 is restored to its normal position.

In order to give an indication of the ends down condition of a traversed textile machine, so that mill personnel at any desired location may be advised thereof and especially to inform an operator responsible for correcting such improper operating conditions, the present invention provides a data system. Preferably the data system includes register means responsive to the operation of the detector means for determining the ends down condition of a traversed machine from the condition of the monitored ends and includes data collecting and display means responsive to the register means for indicating the determined ends down condition of the machine. In the particular apparatus to which the present discussion is directed, the data system is electrically operated and responsive to a change in electrical state of the photosensitive device in the sensor head 30.

It is noted that at least one other inventor has heretofore proposed a remote sensing yarn break detector employing a field of electromagnetic waves brought in turn into proximity with a number of yarns being formed on a textile machine such as a spinning frame. Such proposal is made in U.S. Pat. No. 3,099,829, issued on July 30, 1963, to Laszlo Namenyi-Katz, and disclosing circuitry including a photoelectric device such as a phototransistor arranged to receive light emitted from a lamp and reflected from yarn being formed by a spinning machine. The lamp and the photoelectric device are mounted together on a carriage for movement along the spinning machine, to scan a plurality of yarns being formed thereby, with signals from the photoelectric device being passed to a register means for actuating an alarm device. While the disclosure of the Namenyi-Katz patent is directed primarily to giving an audible, visible or other alarm when any yarn break is detected, the circuitry proposed therein may be adapted to use as detector and register means for one side of a traversed spinning frame in the selective patrolling system of the present invention as hereinafter described more fully if so desired.

Figure 11:
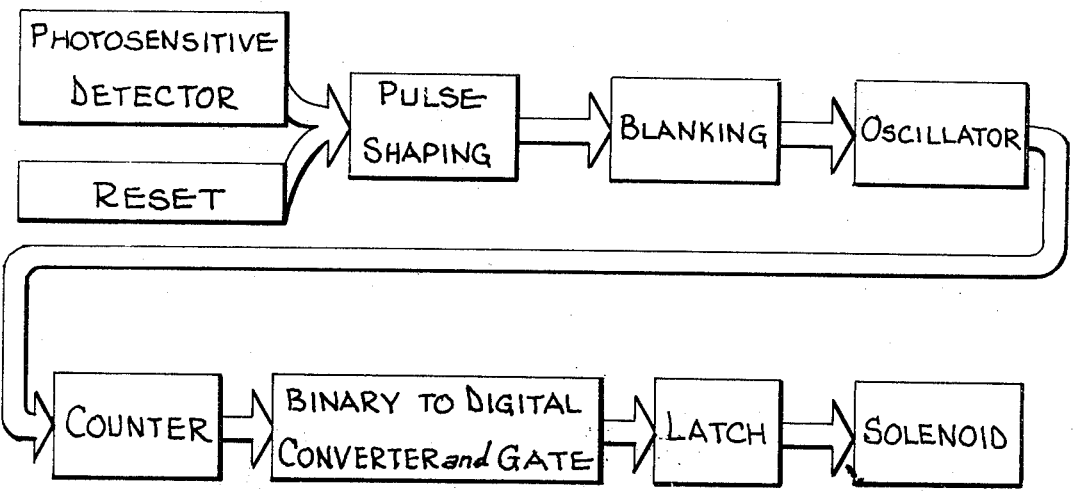
FIG. 11 is a schematic diagram of certain circuit functions incorporated in the apparatus of FIGS. 1, 2 and 5.

A substantial equivalent and a supplement to the Namenyi-Katz circuitry is schematically presented in FIG. 11. From the circuitry there diagramed, signal pulses developed from a detector means such as a photomultiplier tube are passed through pulse shaping circuits to register means having circuitry including a blanking circuit, an oscillator having a predetermined time base, a counter, a converter and gate, and a latch. The time base of the oscillator is so correlated to the normal spacing of the yarns and the linear speed of travel of the traveling unit which moves the corresponding sensor head that no pulses are emitted from the oscillator during the period of time required for the sensor head to move through the gauge distance of the spindles of the spinning frame 25 being traversed. That is, if the machine locations at which yarns normally are being formed are on three and one-half inch centers, the time base of the oscillator is so correlated to the linear speed of the traveling cleaner 26 that no pulse is emitted during the time required for the cleaner 26 to travel three and one-half inches.

However, the time base of the oscillator is so established that a signal pulse indicative of an end down is emitted from the oscillator should the ocsillator not be blanked by a pulse orginating from the photosensitive device or from a reset function during a period of time required for the cleaner 26 to travel a distance of between three and one-half and seven inches. As a result, the appearance of a train of detector signal pulses originating in the photosensitive device and passed through the pulse shaping circuits continues to reset the oscillator and precludes the passage of an end down signal pulse from the oscillator to the counter.

In the absence of an end, the photosensitive detector fails to generate a detector signal pulse to be passed to the blanking circuit, thereby permitting the oscillator to supply an end down signal pulse to the counter. By means of a binary to digital converter and gate, a pulse is passed to a latching circuit upon accumulation in the counter of a pre-set number of end down signal pulses from the oscillator, determined by mill supervisory personnel as indicative of an economically unacceptable operating condition of a spinning frame. That is, should the supervisory personnal determine that operation with less than three ends down on a spinning frame side is acceptable and is not to require the attention of the spinner, the binary to digital converter and gate is pre-set to distinguish a condition of the counter indicative of three pulses having been passed thereto from the oscillator. Upon the counter registering three pulses, a pulse is passed through the gate to the latch which controls energization of a solenoid and transmittal of a signal to a receiver station 70 as discussed hereinafter. The counter thus totals at least a predetermined number of ends down signals during traversal of the detector along a machine and the converter and gate cooperate with the counter in distinguishing whether the ends down signals reflect an acceptable ends down condition or an excessive, unacceptable, ends down condition.

In order to place the circuitry in condition to operate in proper timed relation to the yarns to be sensed on a particular frame, the register means including the oscillator, counter and latch are reset immediately before the traveling unit begins traversal of a frame. Such resetting of the counter and latch additionally ensures that the determination of an ends down condition made by the register means is independent of any previous traverse of a frame and that the ends down condition of the frame, side or portion next traversed is determined solely from monitoring during such traversal. Mechanism for accomplishing this function is shown in FIGS. 10, 5 and 4 wherein reset switches 90 and 90' moving with the traveling cleaner 26 engage actuating cams 91, 91' mounted on the track 27 in predetermined spaced relation to an associated frame 25. The reset switches 90, 90' are electrically connected to the register means circuitry insure that the solenoid is deenergized and the oscillator prepared to emit a pulse should the first end to be sensed prove to be down. Certain improvements over resetting means of this type are the subject matter of copending application Ser. No. 866,264 filed Oct. 14, 1969 entitled Textile Strand Ends Down Detecting Apparatus With Automatic Resetting Means, and owned in common with this application.

It is to be understood that the detailed discussion given immediately above as to circuit arrangements and cooperation is included herein for purposes of full disclosure only, as it is acknowledged that other specific means may be used and that the specifically described means are not critical to the system operation. In point of fact, as stated above with regard to the Namenyi-Katz circuitry, such specific means are the subject of patent protection separate and apart from the present system invention. Certain improvements over the Namenyi-Katz circuitry are, for example, disclosed in copending application Ser. No. 866,265 filed Oct. 14, 1969, entitled Electric Circuit Means for Textile Strand Ends Down Detecting Apparatus and owned in common with this application.

In order to communicate the thusly determined acceptable or unacceptable total ends down condition of a traversed machine from the register means to the data collecting and display means, this invention further provides communicting means incorporated in those elements. Broadly, the communicting means includes transmitter means incorporated in the register means and mounted on the traveling cleaner for movement therewith and receiver means incorporated in the data collecting and display means, responsive to a signal from the transmitter for actuating annunciator means as described hereinafter.

Mounted on the traveling cleaner 26 of the preferred form of apparatus are a pair of transmitter devices in the form of solenoids 50 and 50', each electrically connected with register means having circuitry responsive to a corresponding one of the photosensitive devices. In similarity to the discussion above of the sensor heads, the following discussion will proceed primarily with reference to a single transmitter means, it being understood that the discussion applies to both. The transmitter solenoid 50 comprises an extensible pin 51, supported by a housing 52 for movement with respect to the coil of the solenoid 50 in response to energization of the solenoid and between extended and retracted positions. Upon determination that the number of ends down on a spinning machine as the same is traversed by the traveling cleaner 26 at least reaches a predetermined number, the pin 51 is moved to an exposed position projecting downwardly from the housing 52.

In order to receive a signal that the number of ends down on a particular side of a spinning machine 25 traversed by the traveling cleaner 26 and detector means mounted thereon at least reaches a predetermined number and is thus determined to be an excessive or unacceptable total ends down condition, as indicated by the positioning of the pin 51 in an exposed position, the receiver means comprises a plurality of receiver stations 70 positioned within the spinning room in such a manner that the transmitter solenoid 50 mounted on a traveling cleaner passes in predetermined relationship to each of the stations 70. Each station 70 (FIG. 12) comprises means responsive to a transmitter signal presented when the pin 51 is extended, and communicates data as to the operating condition of a spinning machine 25. By the interaction of elements of the transmitter 50 and a receiver 70, a signal is passed to control actuation of annunciator means incorporated in the data collecting and display means, as by energizing an electric light 45 representing the side of the particular spinning machine 25 on which an unacceptable total ends down condition has been located. Certain improvements over such a transmitter and receiver arrangement are the subject matter of copending application Ser. No. 866,266 filed Oct. 14, 1969, entitled Information Transmitting Means for Textile Strand Ends Down Detecting Apparatus and owned in common with this application.

In particular, each of the receiver stations 70 includes at least a pair of data receiving switches 87 and 87′, for actuation by corresponding extensible pins 51 and 51′. The staggered arrangement of the extensible pins 51, 51′ and operating levers of bent wire for the data receiving switches 87, 87′ insures proper tracking, while the relative spacing of the receiver stations 70 to the machine locations at which yarns normally are being formed by spinning frame 25 (FIG. 2) insure that data is transmitted before the sensor heads 30 and 30′ have been moved sufficiently far beyond the last end of yarn being sensed to result in a false actuation signal being passed to the transmitter means, where the circuitry of FIG. 11 is used. Each of the data receiving switches is connected to appropriate switching devices or relays and to timing means as discussed hereinafter for controlling energization of at least one indicator lamp 45.

In order to insure that the operating conditions of the various spinning machines 25 are properly reported even though, the traveling cleaner 26 may from time to time reverse direction along the track 27 above the spinning machines 25, receiver stations 70 are positioned along the track 27 at each end of each spinning machine 25 which is traversed by the traveling cleaner. In order to insure that no false indications are passed by the data receiving switches 87, 87′, the switches at respective receiver stations 70 adjacent opposite ends of the spinning frame 25 are arranged for actuation of the data receiving switches only on passage of the traveling unit in a corresponding direction. That is, referring now to the view of FIG. 2, the data receiving switches 87, 87′ of the receiver station 70 adjacent the left end of the spinning frame 25 are arranged for actuation should the pins 51, 51′ be extended downwardly upon passage of the traveling cleaner 26 from right to left in that view. Should the pins 51, 51′ be extended upon passage of the traveling cleaner 26 over the receiver station 70 more closely adjacent the right-hand end of the spinning frame 25, the wire levers of the data receiving switches 87, 87′ at that receiver station would be engaged, but switch actuation would not occur.

The circuitry of the receiver stations 70 also includes means for warning an operator that the corresponding machine side has gone unattended for a predetermined time after an excessive ends down condition thereon has been indicated by actuation of the indicator lamp 45. In the particularly form shown, such means comprises a timer 88 operatively connected to relays K2, K4 controlling the connection of a flasher subcircuit FL1, FL2 into the circuit by which the lamp is energized, to controllably vary the state of the lamp following expiration of a predetermined time period such as thirty minutes or one hour. While a flashing light is believed to be a warning which will readily attract the attention of a spinner and of mill supervisory personnel, and a time period since actuation is believed an appropriate basis for initiating variation in actuation, it is contemplated that other warning signals such as progressive brightening of a lamp and progressive energization of a series of differentialy colored lamps may be used and that another basis be selected for initiation of the warning, such as repeated traversals of the frame by the detector.

The operative connection between the receiver stations 70 and relays controlling energization of the indicator lamps 45 may be through the means of conventional conductors (as in FIG. 12) or may employ the power conductors normally provided in the traveling cleaner track 27 if so desired. In the latter instance, means (not shown) are provided at each receiver station 70 for generating a carrier signal, which carrier signal is frequency modulated at a particular frequency representative of the particular frame which has just been traversed by the detector means carried on the traveling cleaner 26. Such a frequency modulated signal is detected on the power conductors of the track 27 by a suitable frequency responsive detector means and employed to control energization of relay windings.

In order to permit an operator to extinguish an indicator lamp 45 after the operator has put up the ends on a side of the spinning machine 25 having an improper condition indicated therefore, the circuitry of FIG. 12 includes manual reset switches included in the holding circuits for the indicator lamps 45. The manual reset switches preferably are pendant type switches positioned for ready access by the operator after the ends down on a side of the spinning machine 25 have been put up.

While it is contemplated that an annunciator means incorporated in the data collecting and display means may take any of a wide variety of detail configurations, may be positioned wherever an indication of the operating condition of the textile machines is of interest including locations remote from the spinning room, and may be employed for purposes of monitoring machine efficiency as well as for purpose of advising a machine operator, it is particularly contemplated by this invention that the annunciator means be located for ready observation by the spinner responsible for correcting the ends down condition determined by the register means. In particular, the annunciator means illustrated in the accompanying drawings comprises a plurality of suitable indicators positioned for ready observation by the personnel in the textile mill, as at the ends of the frames 25, so as to visually indicate to the spinner the occurrence of an excessive ends down condition. Annunciator means of this general type is also disclosed in copending application Ser. No. 762,870 filed Sept. 26, 1968, entitled Apparatus for Reporting Ends Down on Textile Yarn Forming Machines and in U.S. Pat. No. 3,486,319, both owned in common with this application.

Preferably, the annunciator means comprises a plurality of individual electric lamp indicators 45, disposed for display in correlation to the arrangement of the spinning frames 25 in the mill room which the traveling cleaners 26 patrol. Further, an individual lamp 45 is provided for each side of each textile machine and at least at each end of the textile machine to which the individual lamp is correlated. By a suitable choice of different colors for respective transverse lines of machines 25, lamps may be arranged at the cross alleys in the mill room for indicating the condition of machines remote from the alley in which the lamp is positioned. By so arranging the individual indicators, and correlating the actuation thereof to the detection of an excessive or unacceptable total ends down condition on a corresponding side of a corresponding textile machine 25, an operator standing in an alley in the mill may directly observe the location within the spinning room of a spinning frame 25 requiring correction of an excessive ends down condition. Upon actuation of an indicator, the operator may then go directly to a work aisle in which a machine side is shown to require correction, piece up ends in that work aisle, and then go to another work aisle or machine side, depending upon the choice of the mill supervisory personnel as to work practices.

From the above discussion, it is believed that persons skilled in the electronics arts may design a number of variations on the particular arrangement disclosed herein for acquiring and transmitting data from a traveling cleaner 26 to be processed by a stationary data collecting and indicating means. By way of example, without limitation, computer techniques may be employed to permit the processing and transmittal of numerical information. In applying such techniques, use may be made of computer memory and counting means, such as by pre-setting a total number of ends normally present on a spinning machine and subtracting the number of ends actually sensed on traversal of the spinning machine in order to determine a difference number representative of the ends down condition of the machine. Such a difference number may be compared with a predetermined number in distinguishing whether the ends down condition of the machine is acceptable or unacceptable. Data thus registered by elements of the apparatus mounted on and moving with the traveling cleaner 26 may then be transmitted to a stationary receiver by physical contact, by radiant energy of various sorts, or by a number of other available methods.

While the discussion thus far has proceeded with reference to a detector means wherein the means for sensing the presence or absence of an end of yarn has been a photoelectric system scanning the ends of yarn as the spinning machine 25 is traversed by traveling cleaner 26, the present invention contemplates that detector means may include a physical contact device for directly engaging the ends of yarn or other energy level responsive detection systems capable of remotely sensing the presence and absence of ends of yarn.

A physical contact device for detecting the absence or presence of ends of yarn is disclosed in an embodiment herein referred to as a first modified form of apparatus in accordance with this invention (FIGS. 13–19). In the description of the modified apparatus which follows hereinafter, elements corresponding to elements described hereinabove are identified by similar reference characters of a hundreds higher series. In the physical contact apparatus, a yarn engaging wand 133 is mounted in and on, and carried by, a sensor head 130 for physically contacting the ends as the detector means traverses a textile machine. The wand is movable between two positions (solid line and dotted line positions in FIG. 14), respectively corresponding to the detection of the presence of an end and to the detection of the absence of an end. In particular, in the presence of a yarn being formed by the textile machine 25, the wand 133 engaging the end is held in the solid line position of FIG. 14. When the traversal of the textile machine by the detector means, with movement of the traveling cleaner 26 therealong, brings the wand 133 to a position at which an end is down, the wand moves to the dotted line position of FIG. 14. Thereafter, continuing movement of the traveling cleaner 26 brings the wand 133 into engagement with other ends, to lift the wand back to the solid line position.

Within the sensor head 130 is an electrical switching device 133a, operatively connected to and responsive to movement of the sensing wand 133. Upon movement of the sensing wand between the first and second positions, as described above, the conductive state of the device 133a is changed and a detector signal is created in an electrical circuit including the device Preferably, in the illustrated embodiment, normally open contacts of the switch are closed by movement of the wand 133 upon detection of the absence of an end at a work station or spindle of a textile machine, thereby applying electrical current to a register means as discussed more fully hereinafter.

In order to insure that the closing of the contacts of the switch 133a truly reflects the absence of a yarn rather than merely the passage of the sensing means head 130 around a frame end and across an aisle between adjacent textile machines 25, this embodiment includes an override switch 141 in the suspension arrangement for the sensing means head 130, mounted on and carried by the upper arm 136 adjacent a pivotal connection thereof with the lower arm 140. By means of a cam provided on the lower arm 140, the override switch 141 is operated in response to angular displacement of the lower arm 140 relative to the upper arm 136. As the lower arm 140 is swung outwardly by a cam portion of a guide rail 137 extending along the spinning frame 25, to clear the wand 133 of a textile machine frame end, the override switch 141 is opened to interrupt an electrical circuit otherwise including the strand sensing switch 133a.

In the first modified form of apparatus, each register means has a transmitter 150 which comprises a lobed cam member 151, supported by a housing 152 for rotation about a horizontal axis preferably at least generally aligned with the direction of the track 27. A spring 154 biases the cam member 151 toward a normal position, for purposes to be brought out more fully hereinafter. By means of a gear train including a driven gear 155 and a driving gear 156, the cam member 151 is operatively connected to a ratchet wheel 158, which may be acted upon by a pair of dogs 159 and 160. An advancing dog 159 is brought into engagement with the ratchet wheel 158 by an advancing solenoid 161, and, upon energization of the solenoid by closure of the strand sensing switch 133a, drives the ratchet wheel 158 in rotation and causes rotation of the cam member 151 through a predetermined rotational angle at which the holding or blocking dog 160 retains the cam member against the biasing force of the spring 154. From the discussion which follows, it will be understood that rotation of the ratchet wheel 158 totals the ends down detected by this embodiment and distinguishes from that total the ends down condition of the traversed frame.

Upon energization of the advancing solenoid 161 a sufficient number of times to cause rotation of the cam member 151 through a predetermined total rotation (FIG. 15), a cam lobe 162 on the cam member 151 is moved to an exposed position projecting upwardly of the housing 152. In the illustrated form, the position of lobe 162 on the cam member 151 and the relationship of the dogs 159 and 160 to the ratchet wheel 158 and gears 155 and 156 is such that the sensing of seven ends down as the detector means traverses a spinning frame will rotate the cam member 151 through a total rotational angle such that the lobe 162 becomes exposed. Thereafter, due to an interruption in the notched surface of the ratchet wheel 158, any number of ends down in excess of seven will not cause further rotation of the cam member 151. Thus, the register means of this embodiment responds to the totaled ends down at least reaching seven by signalling that the ends down condition of the traversed frame is unacceptable. In so responding, the register means receives detector signals at each change in conductive state of the strand sensing switch 133a, totaling at least a predetermined number of signals and distinguishing therefrom acceptability of the ends down condition of the traversed frame.

Each receiver 170 of the data collecting and display means incorporated in the first modified form of apparatus includes a central housing 171 with a roller member 172 depending therefrom and supported for side-to-side sliding movement. By the use of a pair of biasing springs 174 and 175, and a slide block 176, the depending roller 172 is biased to a normally centered position (FIG. 18). The depending roller 172 is adapted for contact with an elongate skeleton cam member 178 mounted atop the traveling cleaner 26 between the housings 152, 152' for the transmitter cam members 151, 151'. Upon engagement of the skeleton cam member 178 with the roller 172, the roller is moved to one side or another of the centered position, depending upon the direction that the traveling cleaner 26 is traveling with respect to the receiver 170. For example, should the traveling cleaner 26 be moving to the right in FIG. 16, the roller member 172 is displaced downwardly in that figure.

Upon movement of the slide block 176 within the housing 171, a projection thereon successively engages a pair of microswitches 180 and 181 or 180' and 181' included in a communicating electrical circuit as described more fully hereinafter. As the roller 172 is held in the displaced position by the extended portion of the skeleton cam member 178, the housings 152, 152' having cam members 151, 151' thereon pass beneath a pair of receiver switches housed within switch housings 185 and 185'. Each of the receiver switches 187 and 187' includes a cam follower switch actuating lever, which is engaged by an exposed lobe 162, 162' of the cam members 151, 151'.

As the traveling cleaner 26 passes beyond a receiver 170, the depending roller 172 is permitted to return to its normally centered position and engages an actuating lever for one of two reset switches 190, 190' mounted within the skeleton cam 178 atop the traveling cleaner 26. The normally open contacts of the reset switch control the application of electrical current to a reset solenoid 191 incorporated within the transmitter 150. Upon engagement of the roller 172 with the reset switch, the reset solenoid is energized and the holding dog 160 and advancing dog 159 are withdrawn from rotation blocking engagement with the ratchet wheel 158. Upon withdrawal of the dogs 159 and 160, the spring 154 returns the cam member 151 to its normal position, resetting the registering means to a zero count.

During the period of time that the traveling cleaner 26 has passed beneath the receiver 170, the actuation of a pair of the switches 180 and 181 by displacement of the depending roller 172 has performed two functions. In particular, engagement of the sliding block 176 upon displacement thereof to one side of the transmitter housing 171 operates to open contacts of the first switch 180 which are in a holding circuit for maintaining an indication of ends down received by the receiver 170 upon the last previous scanning of the spinning machine 25 by the detector means mounted on the traveling cleaner 26. Thus, any previous indication of the ends down condition of a machine is cleared from the annunciator means prior to the receipt of a new indication of the operating condition of the spinning machine. Thereafter, actuation of the second electrical switch 181 (held closed throughout the period that the data receiving switches 187 and 187' are actuated or not actuated in response to the operating condition of the spinning machine 25) completes a circuit between the data receiving switches and means controlling an indicator lamp 45 representative of the spinning machine 25 last previously traversed by the traveling cleaner 26.

In order to insure that the operating conditions of the various spinning machines 25 are properly reported even though the traveling cleaner 26 may from time to time reverse direction along the track 27 above the spinning machines 25, receivers 70 are positioned along the track 27 to straddle each spinning machine 25 which is traversed by the traveling cleaner.

Other energy responsive detection systems may include systems responsive to sonic energy, including a passive system and an active system. Both of the sonic systems rely upon the discovery that the elements involved in movement as a direct result of the formation and packaging of yarn on a spinning frame 25, including the traveler moving about the spinning ring and the yarn ballooning with the traveler movement, are capable of originating or modifying sonic energy within frequency bands sufficiently different from other sound in the mill room as to be distingiushable and measurable. In the event that an end of yarn is broken or goes down, movement of these elements of the spinning machine 25 stops, and sonic energy is no longer present in the frequency bands characteristic of the presence of an end of yarn.

One illustrated sonic detection system (FIGS. 20 and 21) may be characterized as passive, as responding to energy originating from elements of the spinning machine as described above. Specifically, a sound pipe 216 depends from the main body of the traveling cleaner 26 toward the operating elements of the spinning frame 25 and includes, adjacent its lower end, an elongate slot mouth or opening directed toward the spindle, spinning ring and traveler. Adjacent the upper extremity of the sound pipe 216 is provided a flexible connection 218, for purposes to be described more fully hereinafter, and a transducer box 219 with which the sound pipe 216 communicates. Within the transducer box 219 is a suitable microphonic device or sound transducer 220, responsive in the frequency range of distinctive traveler/yarn sonic energy when the traveler is in motion and the yarn unbroken. Operatively connected to the sound transducer 220, which may be a suitable microphone, is an amplifier to raise the electrical energy derived from the transducer to a suitable working level and a filter for limiting the frequencies to those frequencies particularly distinctive of the operating condition of the spinning machine 25. The resulting electrical signal may be passed through suitable circuitry to control the conductive state of an electrical switching device generating pulses or otherwise operatively cooperating with the system circuitry described hereinabove.

An active sonic detection system (FIGS. 22 and 23) is essentially similar to the passive system described above, with the addition of a sound generating transducer 221 mounted on the depending sound pipe 216. By generation of a distinctive band or frequency of sonic energy, an echo effect from the traveler or the traveler yarn balloon will permit sensing whether or not the yarn is unbroken and the traveler is in motion. Such an active sonic detection system is dependent upon the modification of the energy originating from the sound generating transducer 221, rather than being dependent upon energy originating from elements from the spinning machine as described above.

The sonic detection systems preferably are additionally provided with a position sensitive electrical switching device 222 mounted on the sound pipe 216 below the flexible connection 218. The position sensitive switching device 212 functions similarly to the override switch 41 described above with reference to the first embodiment of the apparatus of the present invention, in order to insure that an ends down condition is not registered in the event that the sound pipe 216 is displaced from the normal depending position.

It is to be noted that, as to all of the embodiments described in detail above, there is no interconnection of the detector means or the data system to or with the drive means for the traveling cleaner 26. Thus, the traveling cleaner continues in its movement along the track 27 irrespective of the ends down condition of any traversed machine. While operation in this manner is particularly favorable in maintaining the desired cycle of patrolling by the traveling unit, it is acknowledged that data collecting and display means as herein disclosed may respond to detector and register means moving with a traveling unit which is stopped in response to the ends down condition of a traversed machine, as for piecing of an end.

In the drawings and specification, there have been set forth preferred embodiments of the invention and although specific terms are employed, they are used in a generic and descriptive sense only and not for purposes of limitation. It will be apparent to those skilled in the art, to whom the disclosure is directed, that variations and modifications may be made without departing from the essence of the invention which should be broadly construed in view of the valuable technological development disclosed.

What is claimed is:

1. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling units each supported for travel along a respective predetermined path for traversing one or more of said machines, detector means mounted on each of said traveling units for monitoring ends of yarn normally being formed by a traversed machine, register means responsive to said detector means for determining the ends down condition of a traversed machine from the condition of the monitored ends, drive means for driving each of said traveling units in movement along said respective path irrespective of the ends down condition of any machine traversed, and data collecting and display means responsive to said register means for indicating an unacceptable total ends down condition of each of said machines after the same has been traversed by one of said traveling units.

2. The combination of claim 1 wherein said register means includes reporting transmitter means mounted on each of said traveling units for reporting the ends down condition of a traversed machine and further wherein said data collecting and display means includes stationary receiver means for receiving reports originating from said transmitter means and indicative of an unacceptable total ends down condition of the traversed machine.

3. The combination of claim 2 wherein said receiver means comprises a plurality of receiver stations each positioned in a predetermined location adjacent a corresponding one of said machines and adjacent said respective predetermined path of the traveling unit traversing said one machine so that each of said transmitter means passes in a predetermined relationship to a receiver station to which a report indicating the ends down condition of said one machine is to be transmitted.

4. The combination of claim 2 wherein said data collecting and display means further includes annunciator means having a number of individual indicators at least corresponding to the number of operating sides of said machines and disposed for display in correlation to the arrangement of said machines in said mill for actuation in response to reports of an excessive ends down condition of a traversed machine and for directing attention to any machine reported to have an excessive number of ends down.

5. The combination of claim 4 wherein said data collecting and display means further includes timing means operatively connected to each of said individual indicators of said annunciator means for controllably varying the state of an individual indicator after actuation thereof has continued for a predetermined period of time and thereby for directing attention to any machine which has gone unattended for said period of time following a report of an excessive number of ends down thereon.

6. The combination of claim 1 wherein said data collecting and display means includes individual indicators disposed for display in correlation to the arrangement of said machines in said mill for actuation in response to reports of the ends down condition of a traversed machine and for directing attention to any machine reported to have an excessive number of ends down, and means operatively connected to each of said idivindual indicators for controllably varying the state of an individual indicator after actuation thereof has continued for a predetermined interval and thereby for directing attention to any machine which has gone unattended for said interval following a report of an excessive number of ends down thereon.

7. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling pneumatic cleaners each supported for travel along a respective predetermined path for traversing one or more of said machines, detector means moving with each of said traveling cleaners for monitoring ends of yarn normally being formed by a traversed machine, register means responsive to said detector means for determining whether a predetermined number of monitored ends are down, drive means for driving each of said traveling cleaners in movement along said respective path irrespective of the ends down condition of any machine traversed, and data collecting and dipslay means responsive to said register means for indicating the ends down condition of said machines.

8. The combination of claim 7 wherein said detector means and said register means responsive thereto are mounted together for movement along a respective predetermined path, wherein said detector means senses during traversal of a machine location at which an end normally is present the condition of the end normally at that location, and further wherein said register means includes means responsive to said detector means for creating an ends down signal upon the absence of an end at a machine location, for totaling ends down signals during traversal of a machine and for distinguishing from the totaled signals between an acceptable operating condition of the traversed machine and an excessive ends down condition thereof.

9. The combination of claim 8 further comprising means for resetting said register means to a condition indicative of no ends down prior to monitoring of the ends normally being formed by a machine to be next traversed.

10. The combination of claim 8 wherein said register means further includes transmitter means responsive to said means distinguishing the condition of the traversed machine for reporting the ends down condition thereof.

11. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling units each supported for travel along a respective predetermined path for traversing one or more of said machines, detector means moving with each of said traveling units for monitoring ends of yarn normally being formed by a traversed machine and for responding during traversal of a machine location at which an end normally is present by signaling the condition of the end at that location, register means moving with and responsive to each of said detector means for determining the ends down condition of a traversed machine and including means for totaling detector signals during traversal of a machine and for distinguishing from the totaled signals between an acceptable operating condition of the traversed machine and an excessive ends down condition thereof, and data collecting and display means responsive to said register means for indicating the ends down condition of said machines.

12. The combination of claim 11 wherein said detector means comprises sensing means positioned to pass adjacent a portion of a traversed machine at which ends normally being formed thereon are exposed for physically contacting such exposed ends and for responding to the absence of an end from a traversed machine location at which an end normally is present.

13. The combination of claim 11 wherein said detector means comprises sensing means positioned to pass adjacent a portion of a traversed machine at which ends normally being formed thereon are exposed for remotely sensing an energy level variation indicative of the condition of such exposed ends.

14. The combination of claim 13 wherein said sensing means comprises a photosensitive device for detecting light reflected from ends being formed on a traversed machine.

15. The combination of claim 13 wherein said sensing means comprises a microphonic device for detecting sound generated by formation of ends on a traversed machine.

16. The combination of claim 13 wherein said detector means further comprises means for radiating energy toward ends being formed on a traversed machine and further wherein said sensing means comprises a device for detecting the modification of such radiated energy by ends being formed.

17. A traveling unit supported for travel along a predetermined path for traversing at least one textile yarn forming machine, detector means mounted on said traveling unit for monitoring ends of yarn normally being formed by a traversed machine, register means on said traveling unit responsive to said detector means for determining whether a predetermined plurality of monitored ends are down, and drive means for driving said traveling unit in movement along said path irrespective of the ends down condition of any machine traversed.

18. A traveling pneumatic cleaner supported for travel along a track defining a predetermined path extending over at least one textile yarn forming machine, detector means mounted on said traveling cleaner for monitoring ends of yarn normally being formed by a traversed machine, register means on said traveling cleaner responsive to said detector means for determining an unacceptable total ends down condition of a traversed machine from the condition of the monitored ends, and drive means for driving said traveling cleaner in movement along said track irrespective of the ends down condition of any machine traversed.

19. The apparatus of claim 18 wherein said detector means comprises a light source positioned to illuminate a portion of the yarn being formed on a traversed machine in an area where ends normally being formed thereon are exposed, and a photosensitive sensing device positioned to receive light emanating from said light source and reflected from yarn being formed at a machine location on the traversed machine and for responding to traversal of a machine location at which an end is present by signaling the presence of that end.

20. The apparatus of claim 19 wherein said register means comprises means for totaling the number of traversed machine locations at which an end normally present is determined to be absent and for distinguishing from the totaled number between an acceptable operating condition of the traversed machine and an excessive ends down condition, and transmitter means responsive to said means distinguishing an excessive ends down condition for reporting the ends down condition of the traversed machine.

21. A method of obtaining an indication of the ends down condition of a number of textile yarn forming machines such as spinning frames arranged in a textile mill in longitudinally extending rows with at least one cross alley for the purposes of facilitating more efficient tending of the machines by an operator and comprising the steps of traversing the machines with at least one traveling unit having a yarn detector mounted thereon, monitoring with the detector a series of ends of yarn normally being formed on a traversed machine side, continuing traversal of the machine by the traveling unit and detector irrespective of the presence or absence of monitored ends while determining the acceptability of the ends down condition of the traversed machine side from the monitored series of ends, and reporting to a data collection system upon a determination of an unacceptable total ends down condition of the traversed machine side.

22. A method according to claim 21 wherein the monitoring of ends includes responding to traversal of machine locations at which ends normally are present by sensing the condition of an end at that location and further wherein the determining of the ends down condition of a traversed machine includes creating an ends down signal upon the absence of an end at a machine location, totaling the ends down signals during traversal of the machine, and comparing the totaled signals with a predetermined number selected as distinguishing between an acceptable operating condition of the traversed machine and an excessive ends down condition thereof.

23. A method according to claim 22 further comprising resetting the total of ends down signals to a condition indicative of no ends down immediately prior to monitoring of the ends normally being formed by a machine to be next traversed.

24. A method according to claim 22 wherein the detector senses the presence of an end and responds by signaling and further wherein the reporting to a data collection system is responsive to a determination that the total number of ends down signals is at least equal to said predetermined number.

25. A method of obtaining an indication of the ends down condition of a number of textile yarn forming machines such as spinning frames arranged in a textile mill in longitudinally extending rows with at least one cross alley for the purposes of facilitating more efficient tending of the machines by an operator and comprising the steps of traversing the machines with at least one traveling pneumatic cleaner having a yarn detector moving therewith, monitoring with the detector the presence and absence of ends of yarn normally being formed by a traversed machine, determining the ends down condition of the traversed machine by registering the absence of a predetermined number of monitored ends, and reporting to a data collection system and the determination of the ends down condition of the traversed machine.

26. A method according to claim 25 wherein the monitoring of ends includes passing a sensor head adjacent a portion of a traversed machine at which ends normally being formed thereon are exposed, and remotely sensing an energy level variation indicative of the condition of such exposed ends.

27. A method according to claim 26 wherein the remote sensing of an energy level variation comprises detecting light reflected from ends being formed on a traversed machine.

28. A method according to claim 26 wherein the remote sensing of an energy level variation comprises detecting sound generated by formation of ends on a traversed machine.

29. A method according to claim 26 wherein the remote sensing of an energy level variation comprises directing wave energy toward ends being formed on a traversed machine, and detecting the modulation of directed wave energy by ends being formed.

30. A method according to claim 25 wherein the monitoring of ends includes passing a sensing wand adjacent a portion of a traversed machine at which ends normally being formed thereon are exposed, and physically contacting such exposed ends with the wand.

31. A method of displaying a comparative indication of the ends down condition of a number of textile yarn forming machines such as spinning frames arranged in a textile mill in longitudinally extending rows with at least one cross alley for the purposes of facilitating more efficient tending of the machine by an operator and comprising the steps of traversing the machines with at least one traveling unit having a yarn detector mounted thereon, monitoring with the detector the ends of yarn normally being formed by a traversed machine, determining the ends down condition of the traversed machine by registering any ends down, upon a determination that at least a predetermined number of ends are down reporting the ends down condition of the traversed machine, and indicating to a machine operator any machine reported to have at least the predetermined number of ends down by actuating an annunciator representative of such machine in response to such a determination.

32. A method according to claim 31 wherein the indicating to a machine operator includes warning the operator that a reported ends down condition on a traversed machine has gone uncorrected for an excessive period of time following actuation of the representative annunciator by controllably varying the state of the annunciator following expiration of such period of time.

33. A method of obtaining data as to the ends down condition of a number of textile yarn forming machines such as spinning frames in a textile mill and comprising the steps of traversing a plurality of the machines with a traveling unit having a yarn detector mounted thereon, monitoring with the detector a series of ends of yarn normally being formed on each traversed machine side, and continuing traversal of the machines by the traveling unit and detector irrespective of the presence or absence of monitored ends while determining the presence of an unacceptable total ends down condition of each machine side from the respective series of monitored ends.

34. A method of obtaining data as to a predetermined ends down condition of a number of textile yarn forming machines such as spinning frames in a textile mill and comprising the steps of traversing the machines with at least one traveling pneumatic cleaner having a yarn detector moving therewith, monitoring with the detector the ends of yarn normally being formed by a traversed machine, and determining the ends down condition of the traversed machine by registering whether a predetermined number of monitored ends are down.

35. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling units each supported for travel along a respective predetermined path for traversing one or more of said machines, detector means mounted on each of said traveling units for monitoring ends of yarn normally being formed at traversed machine locations along a machine, register means communicating with and responsive to said detector means for determining the acceptability of the ends down condition of a traversed machine from the condition of the monitored ends, and display means including individual indicators mounted adjacent each of said machines and communicating with and responsive to said register means for indicating the determination of an unacceptable total ends down condition of each of said machines traversed by one of said traveling units.

36. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling units each supported for travel along a respective predetermined path for traversing one or more of said machines, a pair of detector means mounted on each of said traveling units for monitoring ends of yarn normally being formed at traversed machine locations along both sides of a machine, register means communicating with and responsive to each of said detector means for determining the ends down condition of a traversed machine side from the condition of the monitored ends, and data collecting and display means communicating with and responsive to said register means for indicating the total ends down condition of each side of each of said machines traversed by one of said traveling units.

37. The combination of claim 36 wherein said register means includes reporting transmitter means mounted on each of said traveling units for reporting the ends down condition of traversed machine locations and further wherein said data collecting and display means includes stationary receiver means for receiving reports originating from said transmitter means.

38. The combination of claim 37 wherein said data collecting and display means further includes annunciator means having a number of individual indicators at least corresponding to the number of operating sides of said machines and disposed for display in correlation to the arrangement of said machines in said mill for actuation in response to reports of ends down conditions of traversed machine locations and for directing attention to any machine reported to have an excessive number of ends down.

39. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling pneumatic cleaners each supported for travel along a respective predetermined path for traversing one or more of said machines, detector means moving with each of said traveling cleaners for monitoring ends of yarn normally being formed at traversed machine locations on a machine, register means communicating with and responsive to said detector means for determining the ends down condition of traversed machine locations along a machine from the condition of the monitored ends, drive means for driving each of said traveling cleaners in movement along said respective path irrespective of the ends down condition of any machine location traversed, and data collecting and display means communicating with and responsive to said register means for indicating an unacceptable total ends down condition of said machines.

40. The combination of claim 39 wherein said detector means and said register means responsive thereto are mounted for movement together along a respective predetermined path, wherein said detector means responds during traversal of a machine location at which an end normally is present by signaling the condition of the end normally at that location, and further wherein said register means includes means for receiving detector signals during traversal of a machine for distinguishing from the received signals between an acceptable operating condition of the traversed machine and an unacceptable ends down condition thereof.

41. Apparatus for obtaining an indication of the ends down condition of a number of textile yarn forming machines arranged in a textile mill in longitudinally extending rows with at least one cross alley for the purposes of facilitating more efficient tending of the machines and comprising the combination with said machines of one or more traveling units each supported for travel along a respective predetermined path for traversing one or more of said machines, detector means moving with each of said traveling units for monitoring ends of yarn normally being formed at traversed machine locations on a machine and for responding during traversal of a machine location at which an end normally is present by signaling the condition of the end at that location, register means moving with and responsive to each of said detector means for determining the ends down condition of a traversed machine location and including means for receiving detector signals during traversal of a machine and for distinguishing from the received signals between an acceptable operating condition of the traversed machine and an unacceptable ends down condition thereof, and data collecting and display means responsive to said register means for indicating the ends down condition of said machines.

42. A method of obtaining an indication of the ends down condition of a number of textile yarn forming machines such as spinning frames arranged in a textile mill in longitudinally extending rows with at least one cross alley for the purposes of facilitating more efficient tending of the machines by an operator and comprising the steps of traversing the machines with at least one traveling unit having mounted thereon a yarn detector and a register responsive to the yarn detector, resetting the register only immediately in advance of traversal of the yarn detector along a series of ends of yarn and monitoring with the detector the series of ends of yarn while determining with the register the presence of an unacceptable total ends down condition of the traversed series of yarns.

43. A method of obtaining an indication of the ends down condition of a number of textile yarn forming machines such as spinning frames arranged in a textile mill in longitudinally extending rows with at least one cross alley for the purposes of facilitating more efficient tending of the machines by an operator and comprising the steps of traversing the machines with at least one traveling unit having mounted thereon a yarn detector and a register responsive to the yarn detector, resetting the register in advance of traversal of the detector along a series of ends of yarn normally being formed at traversed machine locations, monitoring with the detector the series of ends of yarn while determining with the register the ends down condition of each end of yarn in the series, and reporting to a data collection system the determination of an unacceptable total ends down condition of the traversed series of ends of yarn.

44. A method of obtaining an indication of the ends down condition of a number of textile yarn forming machines such as spinning frames arranged in a textile mill in longitudinally extending rows with at least one cross alley for the purposes of facilitating more efficient tending of the machines by an operator and comprising the steps of traversing the machines with at least one traveling pneumatic cleaner having a yarn detector moving therewith, monitoring with the detector the ends of yarn normally being formed at traversed machine locations on a machine, determining the acceptability of the ends down condition of the traversed machine locations by registering the condition of the monitored ends, and upon the determination of an unacceptable ends down condition reporting the same to a data collection system.

45. A method of obtaining data as to the ends down condition of a number of textile yarn forming machines such as spinning frames in a textile mill and comprising the steps of traversing the machines with at least one traveling pneumatic cleaner having a yarn detector moving therewith, monitoring with the detector the presence and absence of ends of yarn normally being formed at traversed machine locations on a machine, determining the ends down condition of the traversed machine locations by registering the absence of monitored ends, and displaying the determined ends down condition adjacent the corresponding machine.

46. Apparatus for obtaining an indication of the ends down condition of a number of textile yarn forming machines arranged in a textile mill in longitudinally extending rows with at least one cross alley for the purpose of facilitating more efficient tending of the machines and comprising the combination with said machines of one or more traveling units each supported for travel along a respective predetermined path for traversing one or more of said machines, an electrical lamp mounted on each of said traveling units for illuminating a series of ends of yarn normally being formed at traversed machine locations, a photosensitive detector mounted on each of said traveling units for responding to light from said lamp reflected by ends of yarn present at traversed machine locations and thereby for monitoring the series of ends of yarn, and a data system operatively communicating with said photosensitive detector and responsive thereto for determining the acceptability of the ends down condition of traversed machine locations from the condition of monitored ends and including individual indicators mounted adjacent each of said machines for indicating to a machine operator a determination of an unacceptable total ends down condition of the respective machine.

47. Apparatus for obtaining an indication of the ends down condition of textile yarn forming machines comprising the combination with the machines of one or more traveling units each supported for travel along a predetermined path for traversing one or more of said machines, detector means mounted on each of said traveling units for monitoring ends of yarn normally being formed by a traversed machine, and means responsive to said detector means for determining the presence of at least a plurality of ends down on a traversed machine and indicating an excessive ends down condition.

48. Apparatus for obtaining an indication of the ends down condition of textile yarn forming machines and comprising the combination with the machines of one or more traveling units each supported by and movable along an overhead track for traversing one or more of said machines, detector means mounted on each of said traveling units for monitoring ends of yarn normally being formed by a traversed machine, and means responsive to said detector means for determining the presence of at least a predetermined number of ends down on a traversed machine and indicating an excessive ends down condition.

49. Apparatus for obtaining data as to the ends down condition of a number of textile yarn forming machines comprising the combination with the machines of a traveling unit supported for travel along a predetermined path for traversing one or more of the machines, detector means mounted on the traveling unit for monitoring ends of yarn normally being formed by a traversed machine, and a data system responsive to said detector means for determining the ends down condition of the traversed machine from the condition of the monitored ends and indicating the determined ends down condition, the data system including communicating means operative only after the completion of a traverse by the traveling unit of the traversed machine for communicating from the traveling unit data concerning the ends down condition of the traversed machine.

50. Apparatus for obtaining an indication of the ends down condition of textile yarn forming machines and comprising a traveling unit supported for travel along a predetermined path for traversing one or more of said machines, detector means mounted on said traveling unit for monitoring ends of yarn normally being formed by a traversed machine, register means responsive to said detector means for determining the acceptability of the ends down condition of a traversed machine from each traversal and independently of the ends down condition during any other traversal thereof, and data collecting and display means responsive to said register means for indicating the presence of a predetermined unacceptable number of ends down on said machine.

51. A method of determining an excessive ends down condition of a textile yarn forming machine having a series of ends of yarn normally being formed thereon, said method comprising the steps of monitoring the textile machine with a traveling ends down detector unit while successively determining any ends down in the series of ends of yarn and, upon a determination that a predetermined plurality of ends are down, indicating the presence of such ends down condition.

52. A method of obtaining data as to the ends down condition of a textile yarn forming machine having a series of ends of yarn normally being formed thereon, said method comprising the steps of traversing the textile machine with a traveling pneumatic cleaner having a yarn detector moving therewith while successively determining any ends down in the series of ends of yarn and, upon a determination that a predetermined number of ends are down, indicating the presence of such ends down condition.

53. A method of obtaining data as to the ends down condition of a textile yarn forming machine comprising the steps of traversing the machine with a traveling pneumatic cleaner having a yarn detector moving therewith, monitoring with the detector the presence and absence of ends of yarn normally being formed at traversed machine locations while registering the absence of monitored ends and, in response to registering the absence of at least a predetermined number of ends, displaying the ends down condition of the machine.

References Cited

UNITED STATES PATENTS

| | | | |
|---|---|---|---|
| 3,051,978 | 9/1962 | Auffrey | 15—312 |
| 3,099,829 | 7/1963 | Namenyi-Kutz | 57—81 XR |
| 3,114,233 | 12/1963 | Guri | 28—51 XR |
| 3,411,281 | 11/1968 | Guido et al. | 57—81 XR |
| 3,360,914 | 1/1968 | Black et al. | 15—312 XR |
| 3,430,426 | 3/1969 | Bryan et al. | 57—81 XR |
| 3,432,877 | 3/1969 | Black et al. | 15—312 |
| 3,478,504 | 11/1969 | Nimtz et al. | 57—156 XR |

DONALD E. WATKINS, Primary Examiner

U.S. Cl. X.R.

15—312; 57—81, 156

UNITED STATES PATENT OFFICE
CERTIFICATE OF CORRECTION

Patent No. 3,523,413            Dated August 11, 1970

Inventor(s)     M. Ford et al

It is certified that error appears in the above-identified patent and that said Letters Patent are hereby corrected as shown below:

Column 2 lines 11 and 12 delete "th operation;" ;
         line 67 "effect" should be --effort--.
Column 3 line 10 "interuption" should be --interruption--.
Column 4 line 43 after "certain" insert --circuit--.
Column 5 line 52 after "energy" insert --responsive.
Column 7 line 43 "personnal" should be --personnel--;
         line 48 after "three" insert --end down signal--.
Column 8 line 1 after "circuitry" insert --to--;
         line 74 after "an" insert --excessive or--.
Column 9 line 64 "differentialy" should be --differentially--.
Column 11 line 54 after "device" insert --.--.
Column 18 line 25 delete "and".

SIGNED AND SEALED

FEB 23 1971

(SEAL)
Attest:

Edward M. Fletcher, Jr.
Attesting Officer

WILLIAM E. SCHUYLER, JR.
Commissioner of Patents